US011698188B2

(12) United States Patent
Chanteloup et al.

(10) Patent No.: US 11,698,188 B2
(45) Date of Patent: Jul. 11, 2023

(54) FLAT-JET FUEL INJECTOR FOR AN AIRCRAFT TURBINE ENGINE

(71) Applicant: SAFRAN HELICOPTER ENGINES, Bordes (FR)

(72) Inventors: Denis Chanteloup, Moissy-Cramayel (FR); Thomas Lederlin, Moissy-Cramayel (FR); Guillaume Mauries, Moissy-Cramayel (FR); Simon Meilleurat, Moissy-Cramayel (FR)

(73) Assignee: Safran Helicopter Engines, Bordes (FR)

( * ) Notice: Subject to any disclaimer, the term of this patent is extended or adjusted under 35 U.S.C. 154(b) by 84 days.

(21) Appl. No.: 16/626,243

(22) PCT Filed: Jun. 18, 2018

(86) PCT No.: PCT/EP2018/066043
§ 371 (c)(1),
(2) Date: Dec. 23, 2019

(87) PCT Pub. No.: WO2019/001996
PCT Pub. Date: Jan. 3, 2019

(65) Prior Publication Data
US 2020/0217500 A1 Jul. 9, 2020

(30) Foreign Application Priority Data

Jun. 27, 2017 (FR) ........................................ 1755888

(51) Int. Cl.
F23D 11/00 (2006.01)
F23D 11/38 (2006.01)
(Continued)

(52) U.S. Cl.
CPC .............. *F23D 11/38* (2013.01); *B05B 7/025* (2013.01); *F23R 3/28* (2013.01); *F23R 2900/00004* (2013.01)

(58) Field of Classification Search
None
See application file for complete search history.

(56) References Cited

U.S. PATENT DOCUMENTS 2,607,193 A * 8/1952 Berggren ................. F23R 3/14
60/748
3,447,757 A * 6/1969 Roberts ..................... B05B 1/26
239/596

(Continued)

FOREIGN PATENT DOCUMENTS

EP 2881662 A1 6/2015
FR 2996285 A1 4/2014

(Continued)

OTHER PUBLICATIONS

International Search Report dated Sep. 26, 2018, issued in corresponding International Application No. PCT/EP2018/066043, filed Jun. 18, 2018, 3 pages.

(Continued)

*Primary Examiner* — Edwin Kang
(74) *Attorney, Agent, or Firm* — Christensen O'Connor Johnson Kindness PLLC

(57) ABSTRACT

A flat-jet fuel injector for an aircraft turbine engine, comprising a body having a generally elongate shape having a longitudinal axis A, the body comprising a main pipe having a generally elongate shape having a longitudinal axis B substantially perpendicular to the longitudinal axis A, the two longitudinal ends of the main pipe being connected directly and respectively to longitudinal ends of two secondary pipes having a generally elongate shape having a longitudinal axis C at least substantially parallel to the (Continued)

longitudinal axis A, and being configured to form, respectively, two separate fuel flow inlets intended to meet substantially at the middle of the main pipe which comprises at least one ejection slot for ejecting the fuel jet, wherein at least one of the main and secondary pipes defines a flow area, at least one geometric parameter of which, such as the shape or a dimension, varies along the pipe and/or is different from the same geometric parameter defined by a flow area of another of the pipes.

18 Claims, 5 Drawing Sheets

(51) Int. Cl.
  *B05B 7/02* (2006.01)
  *F23R 3/28* (2006.01)

(56) References Cited

U.S. PATENT DOCUMENTS

| | | | | |
|---|---|---|---|---|
| 3,622,080 | A * | 11/1971 | Greenwood | B05B 7/0861 |
| | | | | 239/545 |
| 3,642,211 | A * | 2/1972 | Place | F23D 11/38 |
| | | | | 239/545 |
| 4,139,157 | A * | 2/1979 | Simmons | F23R 3/28 |
| | | | | 239/404 |
| 5,167,116 | A * | 12/1992 | Koblish | F23D 11/107 |
| | | | | 60/776 |
| 5,492,277 | A * | 2/1996 | Tani | F02M 61/1853 |
| | | | | 239/596 |
| 6,425,755 | B1 * | 7/2002 | Pillard | F23D 11/103 |
| | | | | 239/554 |
| 2003/0182945 | A1 * | 10/2003 | Runkle | F02C 7/224 |
| | | | | 60/776 |
| 2011/0079667 | A1 * | 4/2011 | Stastny | F23R 3/28 |
| | | | | 29/890.142 |
| 2013/0319301 | A1 * | 12/2013 | Okazaki | F23K 5/20 |
| | | | | 239/433 |
| 2014/0223912 | A1 * | 8/2014 | Rullaud | F23R 3/06 |
| | | | | 60/722 |
| 2014/0238037 | A1 * | 8/2014 | Cummings, III | F02C 9/263 |
| | | | | 60/734 |
| 2014/0260301 | A1 * | 9/2014 | Haugsjaahabink | F02C 7/22 |
| | | | | 60/734 |
| 2015/0135716 | A1 | 5/2015 | Ginessin et al. | |
| 2015/0247459 | A1 | 9/2015 | Carrere | |
| 2015/0361895 | A1 * | 12/2015 | Okazaki | F23D 11/38 |
| | | | | 60/737 |
| 2016/0223201 | A1 | 8/2016 | Zink | |
| 2016/0230999 | A1 * | 8/2016 | Okazaki | F02C 3/04 |
| 2017/0248020 | A1 * | 8/2017 | Kimura | F01D 5/187 |
| 2017/0254282 | A1 * | 9/2017 | Sonoda | F02C 9/22 |
| 2018/0266693 | A1 * | 9/2018 | Patel | F23R 3/343 |
| 2018/0371950 | A1 * | 12/2018 | Chartier | B23P 19/10 |

FOREIGN PATENT DOCUMENTS

| | | |
|---|---|---|
| GB | 1258762 A | 12/1971 |
| WO | 2015/063733 A1 | 5/2015 |

OTHER PUBLICATIONS

Written Opinion of the International Searching Authority dated Sep. 26, 2018, issued in corresponding International Application No. PCT/EP2018/066043, filed Jun. 18, 2018, 5 pages.

Written Opinion of the International Searching Authority dated Sep. 26, 2018, issued in corresponding International Application No. PCT/EP2018/066043, filed Jun. 18, 2018, 4 pages.

International Preliminary Report on Patentability dated Dec. 31, 2019, issued in corresponding International Application No. PCT/EP2018/066043, filed Jun. 18, 2018, 1 page.

* cited by examiner

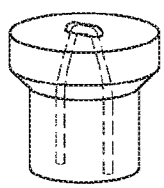 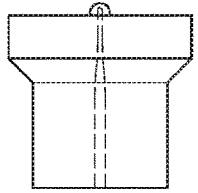 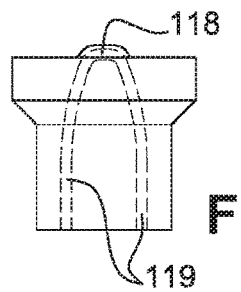
Fig. 8a     Fig. 8b     Fig. 8c
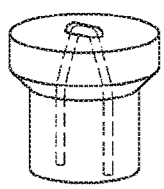 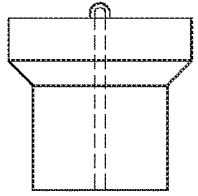 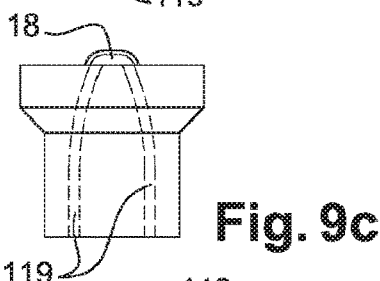
Fig. 9a     Fig. 9b     Fig. 9c
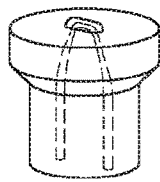 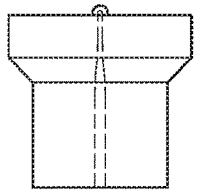 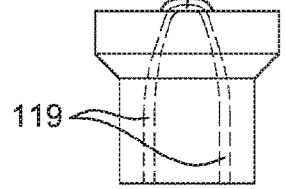
Fig. 10a     Fig. 10b     Fig. 10c
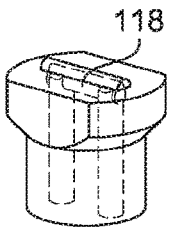 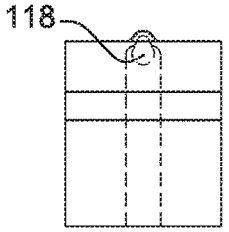 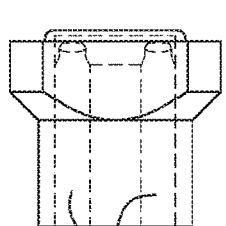
Fig. 11a     Fig. 11b     Fig. 11c
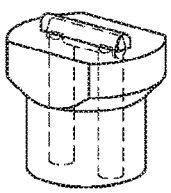 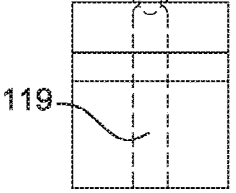 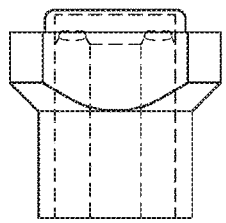
Fig. 12a     Fig. 12b     Fig. 12c
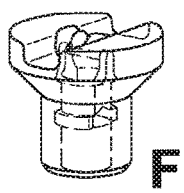 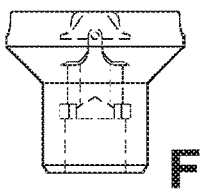 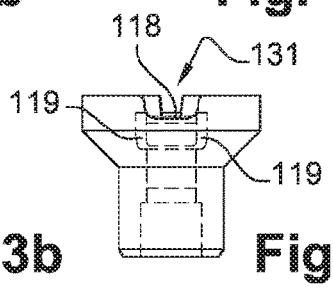
Fig. 13a     Fig. 13b     Fig. 13c

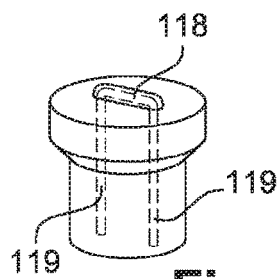
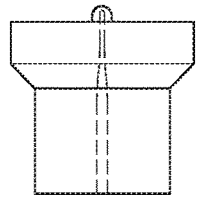
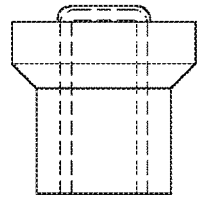
Fig. 14a　　　Fig. 14b　　　Fig. 14c
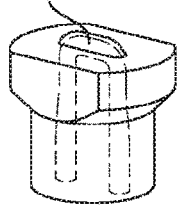
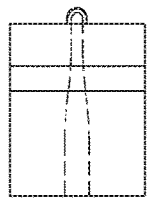
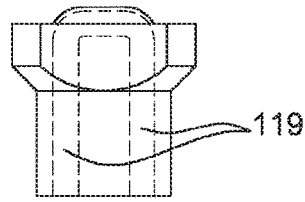
Fig. 15a　　　Fig. 15b　　　Fig. 15c
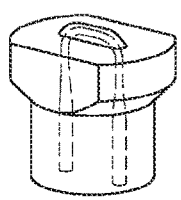
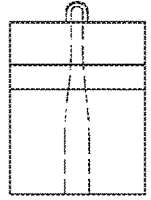
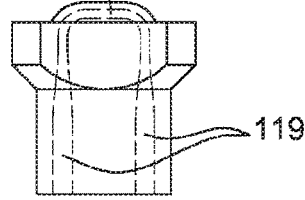
Fig. 16a　　　Fig. 16b　　　Fig. 16c
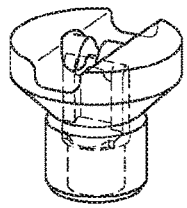
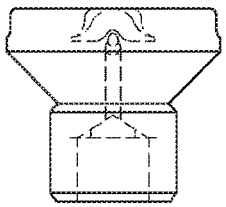
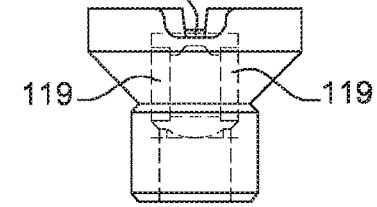
Fig. 17a　　　Fig. 17b　　　Fig. 17c
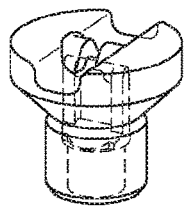
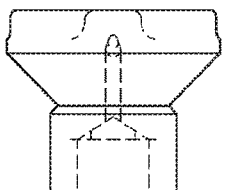
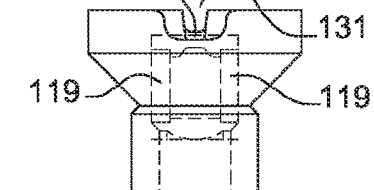
Fig. 18a　　　Fig. 18b　　　Fig. 18c
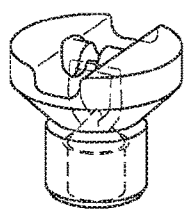
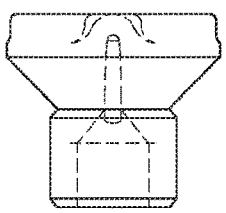
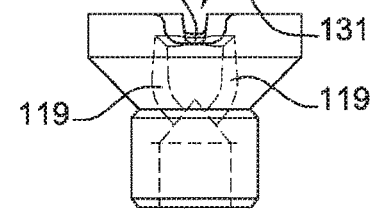
Fig. 19a　　　Fig. 19b　　　Fig. 19c

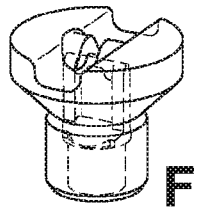 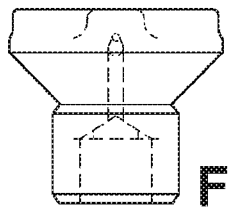 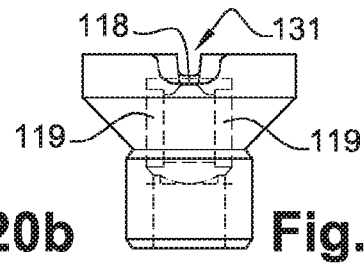
Fig. 20a  Fig. 20b  Fig. 20c
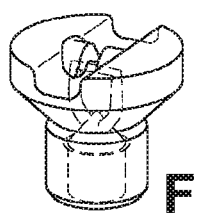 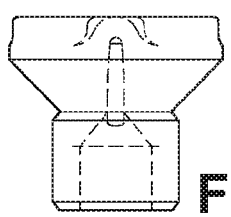 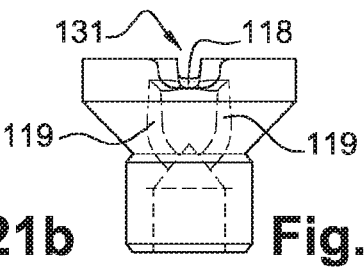
Fig. 21a  Fig. 21b  Fig. 21c
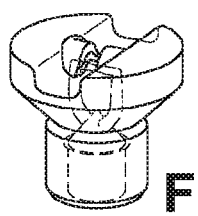 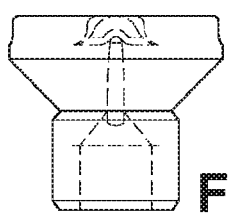 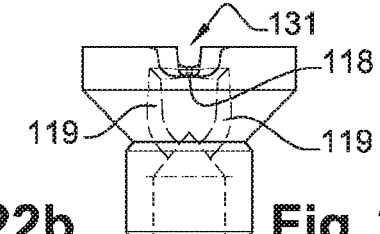
Fig. 22a  Fig. 22b  Fig. 22c
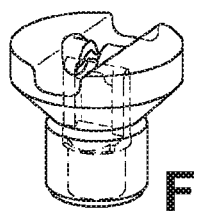 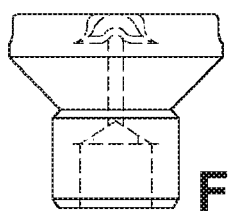 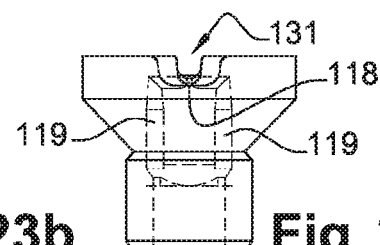
Fig. 23a  Fig. 23b  Fig. 23c
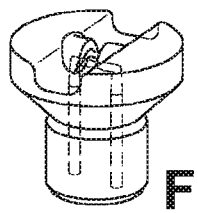 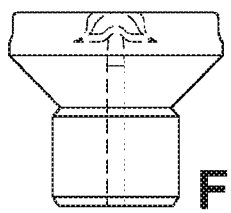 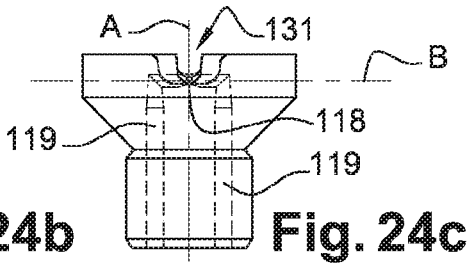
Fig. 24a  Fig. 24b  Fig. 24c
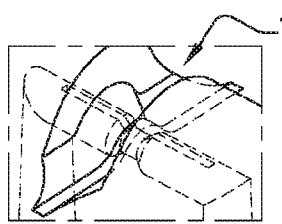 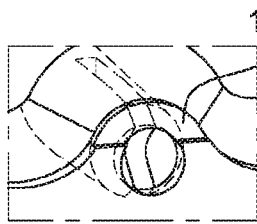
Fig. 24d  Fig. 24e

FLAT-JET FUEL INJECTOR FOR AN AIRCRAFT TURBINE ENGINE

TECHNICAL FIELD

This invention concerns a flat-jet fuel injector for an aircraft turbine engine.

BACKGROUND

The background comprises in particular the documents FR-A1-2 971 039 and FR-A1-3 013 805.

A mixture of compressed air and suitable fuel is generally injected in a combustion chamber of turbine engine using one or more injectors. The injectors are for example fixed on a housing and pass through the orifices of a chamber wall in preparation for ejecting fuel inside the chamber in the form of a sheet of fuel droplets.

A flat-jet fuel injector 10, such as the one shown in FIGS. 1 to 4, typically comprises a body 12 with a generally elongated shape having an elongation axis A. The body 12 comprises a first longitudinal end 14 for fuel supply and a second longitudinal end 16 for ejection of a flat-jet of fuel. This second end 16 comprises a main pipe 18 with generally elongated shape having an elongation axis B substantially perpendicular to the elongation axis A. The main pipe 18 has its two open longitudinal ends 20 configured for forming respectively two distinct fuel flow inlets (arrows 22) intended to meet substantially in the middle of the pipe 18 which comprises at least a slot 24 for ejecting the fuel jet (arrow 26).

The geometric characteristics of the sheet of droplets (jet angle, droplet diameter, etc.) depend in particular on the flow (speed, flow rate and secondary flows) of fuel in the injector just before its ejection. The current technical solutions for guiding the fuel in the injector, use usually the main pipe 18 mentioned above.

In the current technique, this main pipe 18 is formed by a micro-tube attached and fixed in the body 12. The integration of the micro-tube into the body of the injector comprises many steps and it is complex. Indeed, the volume in which the micro-tube is integrated is small and difficult to access, owing in particular to the presence of an air system of purging around the fuel flow inside the injector. The assembly of the micro-tube is thus technically delicate and expensive.

The background includes the documents GB-A-1258762, US-A1-2016/223201, FR-A1-2996285, EP-A1-2881662, US-A1-2015/135716 and WO-A1-2015/063733.

DISCLOSURE OF THE INVENTION

This invention proposes a further improvement of the technology described above, which represents a simple, effective and economical solution to at least a part of the problems mentioned above.

The invention proposes a flat-jet fuel injector for an aircraft turbine engine, comprising a body with a generally elongated shape having an elongation axis A, said body comprising a first longitudinal end for fuel supply and a second longitudinal end for ejecting a fuel flat-jet, said second end comprising a main pipe with a generally elongated shape having an elongation axis B substantially perpendicular to said elongation axis A, said main pipe having its two longitudinal ends which are connected directly and respectively to longitudinal ends of two secondary pipes having a generally elongated shape having an elongation axis C at least in part substantially parallel to said elongation axis A, and which are configured for forming respectively two separate fuel flow inlets intended to meet substantially at the middle of said main pipe which comprises at least one slot for ejecting said fuel jet, characterised in that at least one of said main and secondary pipes defines a flow area, at least one geometric parameter of which, such as shape or dimension, varies along said pipe and/or is different from the same geometric parameter defined by a flow area of another of said pipes.

The invention thus enables to authorize an evolution, in other words variations in the flow areas between the secondary pipes and the main pipe, as well as evolutions inside even the main and secondary pipes. This evolutionary geometry of the flow areas enables to influence the flow of fuel in the body of the injector, in order to control the characteristics of the sheet of fuel at the outlet of the injector.

The injector according to the invention can comprise one or more of the following characteristics, taken in isolation from each other or in combination with each other:

- the flow area of said main pipe has an elliptical, oval, or ovoid shape; this enables to improve the manufacturability in additive manufacturing by avoiding collapses of the main pipe during this manufacture;
- said main pipe is partially protruding at said second end of said body; this enables to generate a disturbance in the fuel jet, as soon as it is created;
- said slot is located at the bottom of a bowl of said second end of said body; this enables to optimize the influence of the air, being able to leave the injector, on the generation of the fuel jet;
- said body and said main and secondary pipes are formed in one piece, for example of metal; the manufacture of the injector is thus simplified since it is no longer necessary to return and fix the tubular part such a micro-tube in the body of the injector; the injector can thus be of the monobloc type and not require connected pieces; the manufacture of the injector is therefore very simplified compared to the previous technique and at least some of the disadvantages described above are eliminated (reduction in production or purchase costs, gain in assembly/machining, etc.).
- said first longitudinal end of said body is connected to a fixing base which is formed in one piece with said body; the injector is thus less expensive to manufacture since it is not necessary to connect a fixing base to the body of the injector, which represents a gain in terms of assembly and positioning of the pieces of the injector;
- said body comprises at least one internal longitudinal channel of air flow, extending to said second longitudinal end and opening at said end; this enables to supply air to the end of the injector in order to for example better control the angle of the jet;
- said at least one channel of air flow is in fluid communication with an annular row of air supply orifices formed at the periphery of the body and extending around said elongation axis A; these orifices form an inlet of the air circuit of the injector, whose outlet is preferably located at the upper end of the injector, as explained above; in variant, said at least one air flow channel is in fluid communication with an air supply window formed in the body, for example oriented facing the compressor of the turbine engine in order to feed the injector with air;
- the main pipe has an internal diameter comprised between 0.4 mm and 0.8 mm; naturally, in the case of a non-circular section pipe, this range represents a range for a section equivalent to a diameter; these values enable to optimize the acceleration of the fluid at the outlet of the injector;

the ejection slot has a thickness or dimension along the axis B, which is comprised between 0.1 mm and 0.5 mm; this enables a better calibration of the flow rate and the shape of the jet.

The present invention also concerns an aircraft turbine engine, comprising a combustion chamber with a wall traversed by an injector as described above.

This invention also concerns a method for manufacturing a flat-jet fuel injector as described above, by a technique of additive manufacturing, for example by laser fusion on powder beds.

DESCRIPTION OF THE FIGURES

The invention will be better understood and other details, characteristics and advantages of the invention will become apparent from reading the following detailed description as a non-limiting example and of which reference is made to the accompanying figures in which:

FIGS. 7a to 24c are similar views to those in FIGS. 6a to 6d and illustrate several variant embodiments of a part of a flat-jet fuel injector for an aircraft turbine engine according to the invention, FIGS. 24d and 24e are schematic views in larger scale of the details of the variant embodiment of FIGS. 24a to 24c.

DETAILED DESCRIPTION

FIGS. 1 to 4 have been described above but can be used to better understand the invention naturally.

Figure 5:
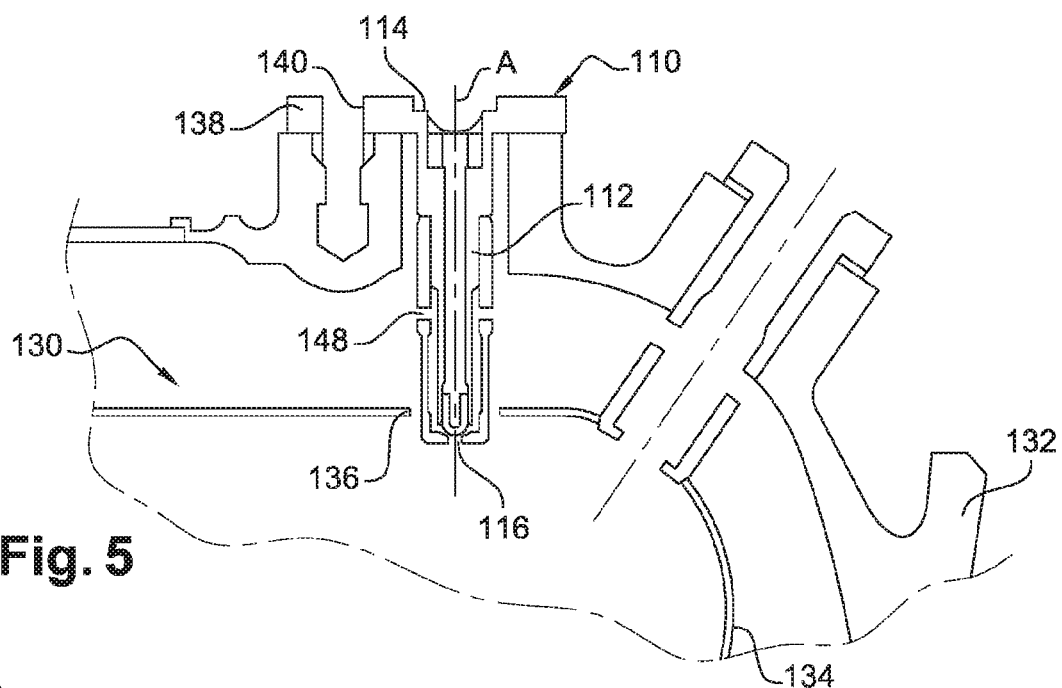
FIG. 5 is a partial schematic axial cross-sectional view of a combustion chamber of an aircraft turbine engine.

FIG. 5 shows an environment in which a flat-jet fuel injector 110 can be used. This is a combustion module of an aircraft turbine engine such a helicopter, this module comprising a combustion chamber 130.

The combustion chamber 130 is located inside a housing 132 of the turbine engine and comprises a wall 134 defining internally a combustion space in which a mixture of air and fuel is injected and burned.

The fuel is injected in the chamber 130 through one or more injectors 110 which are here fixed on the housing 132 and which pass through an orifice 136 of the wall 134.

Figure 1:
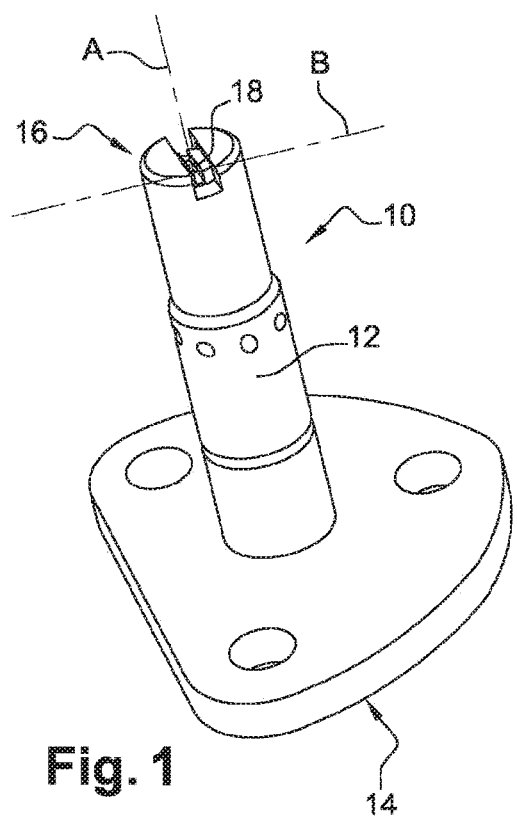
FIG. 1 is a schematic view in perspective of a flat-jet fuel injector for an aircraft turbine engine.
Figure 2:
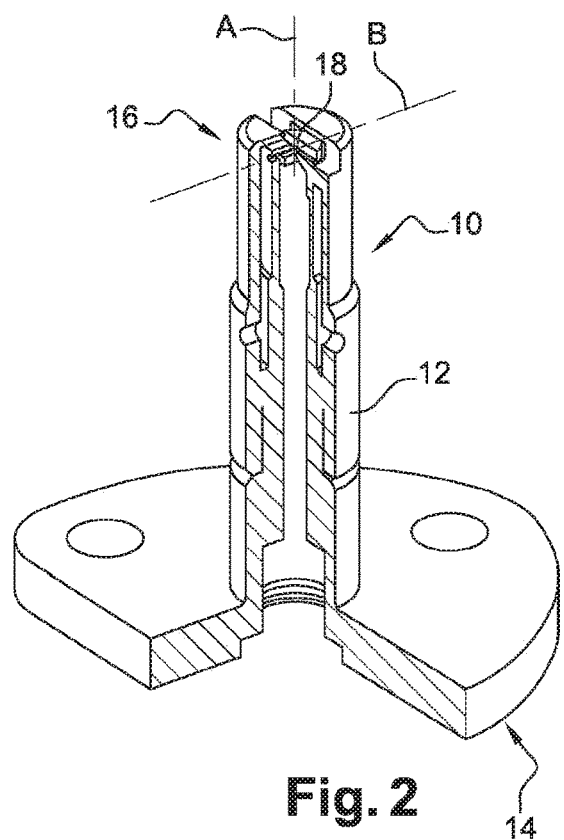
FIG. 2 is another schematic view in perspective and in cross-sectional view of the injector of FIG. 1.
Figure 3:
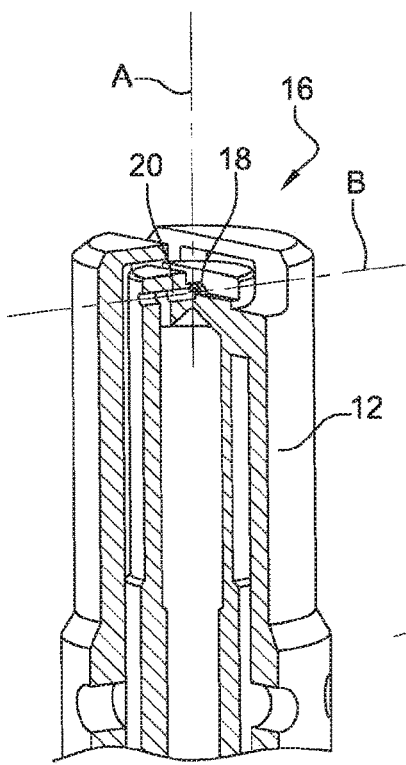
FIG. 3 is a view of larger scale of a detail of FIG. 2.
Figure 4:
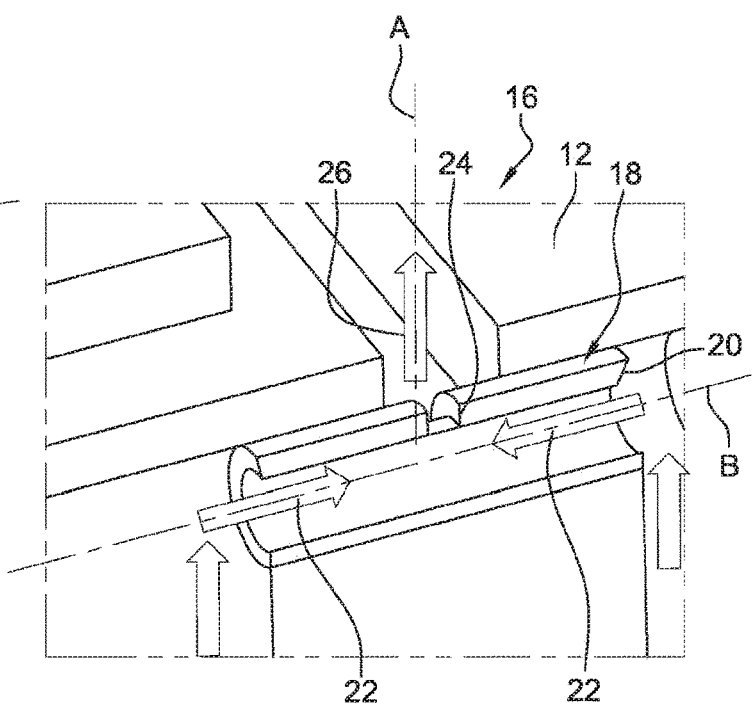
FIG. 4 is a view of an even larger scale of a detail of the injector of FIG. 1.

The or each injector 110 is of the type of the one shown in FIG. 1 and described above.

FIGS. 6a to 24e show several variant embodiments of the injector 110. The injector 110 comprises a body 112 with a generally elongated shape having an elongation axis A, this body 112 comprising a first longitudinal end 114 for fuel supply and a second longitudinal end 116 for ejecting a flat-jet of fuel. This second end 116 has a main pipe 118 with a generally elongated shape having an elongation axis B substantially perpendicular to the elongation axis A. The main pipe 118 has its two open longitudinal ends 120 configured for forming respectively two distinct inlets of fuel flow intended to meet substantially in the middle of the main pipe 118 which comprises at least a slot 124 for ejecting the fuel jet.

According to the invention, the main pipe 118 has its two longitudinal ends 120 which are connected directly and respectively to longitudinal ends of two secondary pipes 119 with a generally elongated shape having an elongation axis C at least in part substantially parallel to said elongation axis A. The main pipe 118 defines a flow area whose at least one geometric parameter such as a shape or dimension is different from the same geometric parameter defined by a flow area of each of said secondary pipes 119. At least one geometric parameter of each pipe 118, 119 can further vary along its longitudinal dimension.

The fact of being able to produce the internal pipes 118, 119 of the fuel system with evolutionary geometries enables:
to accelerate or slow down the fuel in the desired areas,
to influence the internal secondary flows,
to modify the pressure losses in the desired areas,
to reduce coking sensitivity (section restriction only at the area where the flow rate must be high).

This solution also enables to modify the surface conditions of the internal pipes with for example the addition of disturbances in the pipes. The secondary pipes could also have a screw or helical geometry for imposing a rotation of the fuel in the pipes.

Figures 6A, 6B, 6C, 6D:
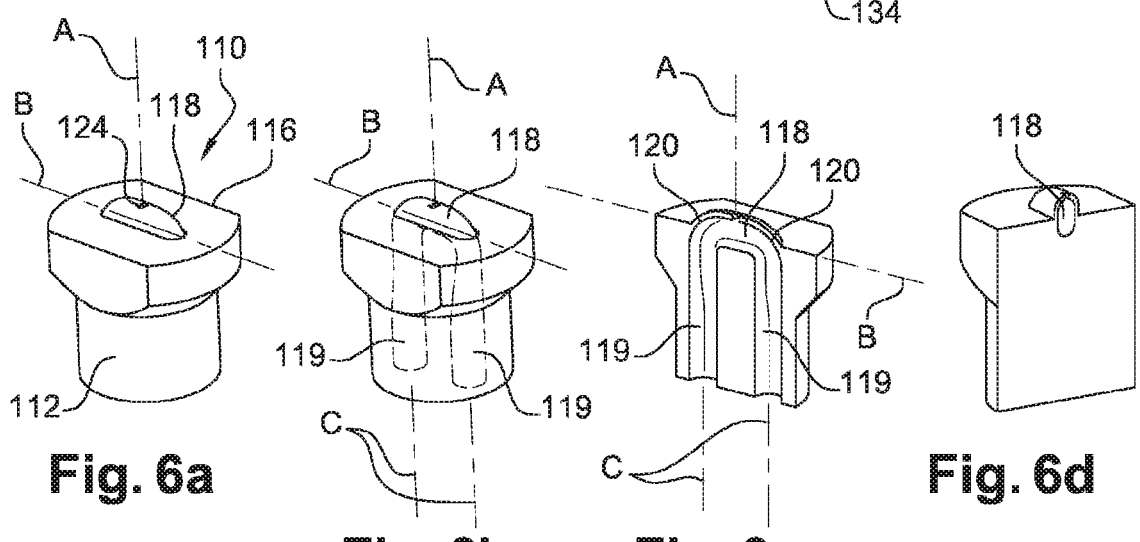
FIGS. 6a to 6d are schematic views in perspective and some in cross-sectional view or in transparency of a part of a flat-jet fuel injector for an aircraft turbine engine according to the invention.
Figures 7A, 7B, 7C, 7D:
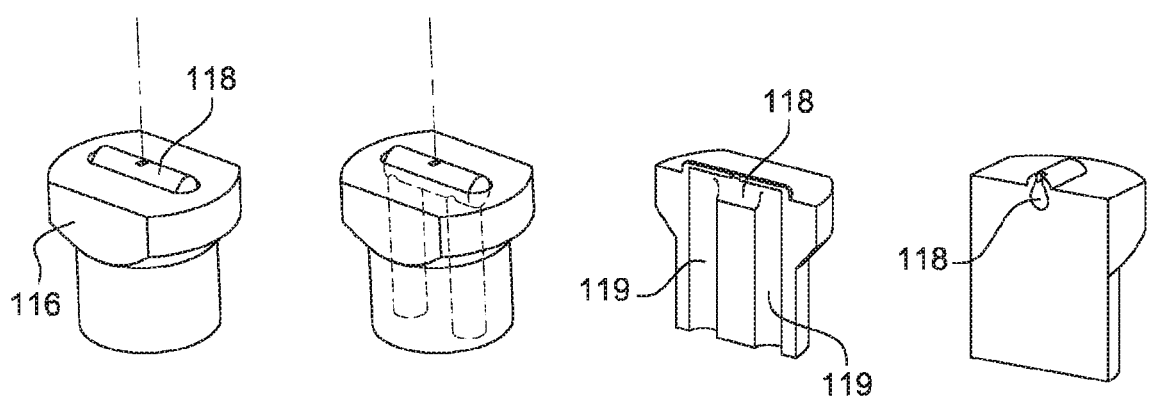

FIG. 6a and the following illustrate many variants embodiments of the invention, in which the flow area of the main pipe 118 has an elliptical or oval shape (FIGS. 6a-6d), circular or semi-circular shape (FIGS. 13a-13c, 20a-20c, 22a-22c, 23a-23c, 24a-24c), triangular or trapezoidal shape (FIGS. 21a-21c), or ovoid shape (FIGS. 7a-7d, 11a-12c, 17a-18c).

In the case of FIGS. 6a to 6d, each pipe 119 has an evolutionary section. It has a round shape in section at its lower end and an oblong shape in section at its upper end connected to the pipe 118, which has itself an oblong section substantially constant. In a particular example of embodiment of the invention, the diameter of the round section of each pipe 119 is comprised between 0.6 and 1 mm and the pipe 118 has its oblong section which has a length substantially equal to this diameter and a width substantially equal to this diameter divided by a factor comprised between 1.5 and 2. This is also the case for the variants of the FIGS. 14a-14c and 15a-15.

In the case of FIGS. 7a to 7d, each pipe 119 has a round section substantially constant and the pipe 118 has an ovoid shape substantially constant. In a particular example of embodiment of the invention, the diameter of each pipe 119 is comprised between 0.8 and 1 mm and the ratio between the surface of the section of the pipe 119 and the surface of the section of the pipe 118 is comprised between 1.5 and 2. This is also the case for the variants of FIGS. 11a-11c and 12a-12c.

In the case of FIGS. 8a to 8c, each pipe 119 has a generally curved shape evolving from a round section towards an oblong section in the vicinity of the pipe 118. The pipe 118 has an oblong section substantially constant and the pipe 118 has an ovoid shape substantially constant. In a particular example of embodiment of the invention, the diameter of each pipe 119 is about 0.4 mm and the pipe 118 has its oblong section which has a length substantially equal to this diameter and a width substantially equal to this diameter divided by a factor between 1.5 and 2.

In the case of FIGS. 9a to 9c, each pipe 119 has a generally curved shape with a round section substantially constant. The pipe 118 has a round section substantially constant. In a particular example of embodiment of the invention, the diameter of the pipes 118, 119 is 0.4 mm approximately.

In the case of FIGS. 10a to 10c, each pipe 119 has a generally curved shape with a progressive reduction of the round section in the vicinity of the pipe 118. The pipe 118 has a round section substantially constant. In a particular example of embodiment of the invention, the maximum diameter of each pipe 119 is comprised between 0.5 mm and 1 mm and the pipe 118 has a diameter substantially equal to this maximum diameter divided by a factor comprised between 1.5 and 3.

In the case of FIGS. 13a to 13c, each pipe 119 has a progressive reduction of its rectangular section at the level of the pipe 118, which has a round section substantially constant. In a particular example of embodiment of the invention, the diameter of the pipe 118 is in the range of 0.4 mm.

In the case of FIGS. 16a to 16c, each pipe 119 has a progressive reduction of its round section to the vicinity of the pipe 118. The pipe 118 has a round section substantially constant. In a particular example of embodiment of the invention, the diameter of each pipe 119 is comprised between 0.7 and 1 mm and the pipe 118 has a diameter equal to the maximum diameter of the pipe 118 divided by a factor comprised between 1.5 and 2.

In the case of FIGS. 17a to 17c, each pipe 119 has a rectangular section substantially constant. The pipe 118 has an ovoid section with an evolutionary shape with a reduction at the slot. In a particular example of embodiment of the invention, the ratio between the surface of the section of each pipe 119 and the surface of the section of the pipe 118, right at the level of its connection with the pipe 119, is in the range of 1.15. The ratio between the surface of the ovoid section of the pipe 118, at its connection to the pipe 119, and the surface of the section of the pipe 118, at the slot, is in the range of 2.5. This is also the case for the variant of FIGS. 18a-18c.

In the case of FIGS. 19a to 19c, each pipe 119 has a circular section having a reduction to the pipe 118. The pipe 118 also has a circular section with an evolutionary shape with a reduction at the slot. In a particular example of embodiment of the invention, the diameter of each pipe 119 is comprised between 0.5 and 0.8 mm and the diameter of the pipe 118 is comprised between 0.35 and 0.5 mm.

In the case of FIGS. 20a to 20c, each pipe 119 has a rectangular section substantially constant. The pipe 118 has an ovoid section with an evolutionary shape with a circular section at the slot.

In a particular example of embodiment of the invention, the ratio between the surface of the section of each pipe 119 and the surface of the section of the pipe 118, right at its connection to the pipe 119, is in the range of 1.15. The ratio between the surfaces of the maximum and minimum sections of the pipe 118 is in the range of 5, the smallest diameter of the pipe 118 being 0.4 mm approximately.

In the case of FIGS. 21a to 21c, each pipe 119 has a circular section of evolutionary shape with a reduction at the pipe 118. The pipe 118 has a square section substantially constant. In a particular example of embodiment of the invention, the diameter of the pipe 119 varies between 0.5 and 0.8 mm. The pipe 118 has a square section of 0.4 mm on the side.

In the case of FIGS. 22a to 22c, each pipe 119 has a circular section of evolutionary shape with a reduction at the pipe 118. The pipe 118 has a half-moon section with a reduction of the section at the slot. A vertical central wall is provided in the pipe 118 and divides it in two half-sections. This wall is not visible in the drawings and will be better described with reference to the last embodiment. This is also the case for the variants of FIGS. 23a-23c and 24a-24c.

The main pipe 118 can be partially protruding at said second end of the body 112. This is the case for the variants of FIGS. 6a to 12c, 14a to 16c, etc. In the variant of FIGS. 12a-12c, the pipe 118 protrudes more than in the variant of FIGS. 11a-11c.

In variant, the slot 124 is located at the bottom of a bowl 131 at the second end 116 of the body 111. This is the case of the examples of FIGS. 13a-13c and 17a to 24e.

The main pipe 118 can be divided in two parts of substantially semi-circular or half-moon section, by a transverse wall extending along the axis B and in a plan parallel to the axis A (see FIGS. 24a to 24e). The half-moon sections of the halves of the pipe 118 can themselves be evolutionary. The transverse wall enables in particular to limit the risk of collapse of the material during the additive manufacture of the injector. The wall has for example a thickness in the range of 0.12 mm.

The body 112 and the main 118 and secondary 119 pipes are preferably formed in one piece, for example of metal.

Although this is not visible in these variants, as it is the case with the injector in FIG. 1, the first longitudinal end 114 of the body 112 is connected to a fixing base 138 which is formed in one piece with the body (FIG. 5). This base 138 can comprise orifices 140 for the passage of fixing means, such as screws, to the housing 132.

The body of the injector can in addition comprise at least one internal longitudinal channel of air flow, extending to the second longitudinal end 116 and opening at that end. This channel of air flow is in fluid communication with an annular row of orifices 148 of air supply formed around the periphery of the body 112 and extending around the elongation axis A (FIG. 5). In variant, the orifices could be replaced by a single window located in front of the compressor of the turbine engine.

As mentioned above, the fact of being able to produce internal pipes of the fuel system with evolutionary geometries enables to control finely the spray performance of the injector, and thus its ignition/blowing performance, to accelerate or slow down the fuel in the desired areas, to influence the internal secondary flows, to modify the pressure losses in the desired areas, and to reduce the sensitivity of the coking process (restriction of the section only at the area where the flow rate must be high).

This progress is made possible today for example by the availability of the method of additive manufacturing by laser fusion on powder beds.

Additive manufacturing enables to increase the manufacturability of the injector, simplify the design, manufacturing cost, functional robustness of flat-jet injectors, reduce the sensitivity of the slot machining depth, and eliminate the operations of assembly (brazing, welding).

The invention claimed is:

1. A flat-jet fuel injector for an aircraft turbine engine, comprising:
  a body with a generally elongated shape having an elongation axis A, said body comprising a first longitudinal end for fuel supply and a second longitudinal end which ejects a flat-jet of fuel outside the flat-jet fuel injector, said second longitudinal end comprising a main pipe, the main pipe having a generally elongated shape with an elongation axis B substantially perpendicular to said elongation axis A, said main pipe having its two longitudinal ends which are connected directly and respectively to longitudinal ends of two secondary pipes with a generally elongated shape having an elongation axis C at least substantially parallel to said elongation axis A, and which are configured for forming respectively two separate fuel flow inlets intended to meet substantially in a middle of said main pipe which comprises at least one slot which ejects said flat-jet of fuel outside the flat-jet fuel injector, wherein at least one of said main and secondary pipes defines a flow cross-section area, having at least one geometric parameter such as shape or dimension, which varies along said at least one pipe of said main and secondary pipes and/or is different from the same geometric parameter defined by a flow cross-section area of another of said at least one pipe of said main and secondary pipes, wherein said main pipe comprises an inner wall that is substantially parallel to the elongation axis B, the inner wall dividing the flow cross-section area of the main pipe into two parts, wherein said main pipe has a central portion in which said at least one slot is located, the inner wall being open in said central portion.

2. The injector according to claim 1, wherein the flow cross-section area of said main pipe has an elliptical, circular, triangular, trapezoidal, oval, or ovoid shape.

3. The injector according to claim 1, wherein said main pipe is partially protruding at said second longitudinal end of said body.

4. The injector according to claim 1, wherein said at least one slot is located at a bottom of a bowl of said second longitudinal end of said body.

5. The injector according to claim 1, wherein said body and said main and secondary pipes are formed in one piece.

6. The injector according to claim 5, wherein said one piece is made of metal.

7. The injector according to claim 1, wherein said first longitudinal end of said body is connected to a fixing base which is formed in one piece with said body.

8. The injector according to claim 1, wherein said body comprises at least one internal longitudinal channel of air flow extending to and opening at said second longitudinal end.

9. The injector according to claim 8, wherein said at least one channel of air flow is in fluid communication with an annular row of air supply orifices formed at a periphery of the body and extending around said elongation axis A.

10. The injector according to claim 8, wherein said at least one channel of air flow is in fluid communication with an air supply window formed in the body.

11. The injector according to claim 1, wherein said second longitudinal end comprises an end surface that is substantially perpendicular to the elongation axis A, said middle of said main pipe protruding beyond said end surface.

12. The injector according to claim 1, wherein said second longitudinal end comprises a transverse groove that is substantially perpendicular to the elongation axes A and B, said middle of said main pipe protruding into said transverse groove.

13. The injector according to claim 1, wherein said second longitudinal end comprises a transverse groove that is substantially perpendicular to the elongation axes A and B, said at least one slot of said main pipe protruding into said transverse groove.

14. The injector according to claim 1, wherein said main pipe comprises a reduction in the flow cross-section area at said at least one slot.

15. The injector according to claim 1, wherein said main pipe has two end portions separated by the central portion, each end portion has a flow cross-section which is divided by the inner wall.

16. The injector according to claim 15, wherein the flow cross-section of each of said two end portions has two semi-circular parts separated by the inner wall.

17. The injector according to claim 1, wherein said central portion of the main pipe has a circular flow cross-section.

18. An aircraft turbine engine, comprising a combustion chamber with a wall traversed by a flat-jet fuel injector comprising:

a body with a generally elongated shape having an elongation axis A, said body comprising a first longitudinal end for fuel supply and a second longitudinal end which ejects a flat-jet of fuel outside the flat-jet fuel injector, said second longitudinal end comprising a main pipe, the main pipe having a generally elongated shape with an elongation axis B substantially perpendicular to said elongation axis A, said main pipe having its two longitudinal ends which are connected directly and respectively to longitudinal ends of two secondary pipes with a generally elongated shape having an elongation axis C at least substantially parallel to said elongation axis A, and which are configured for forming respectively two separate fuel flow inlets intended to meet substantially in a middle of said main pipe which comprises at least one slot which ejects said flat-jet of fuel outside the flat-jet fuel injector, wherein at least one of said main and secondary pipes defines a flow cross-section area, having at least one geometric parameter such as shape or dimension, which varies along said at least one pipe of said main and secondary pipes and/or is different from the same geometric parameter defined by a flow cross-section area of another of said at least one pipe of said main and secondary pipes, wherein said main pipe comprises an inner wall that is substantially parallel to the elongation axis B, the inner wall dividing the flow cross-section area of the main pipe into two parts, wherein said main pipe has a central portion in which said at least one slot is located, the inner wall being open in said central portion.

* * * * *